United States Patent
Mardikar et al.

(10) Patent No.: US 8,150,772 B2
(45) Date of Patent: Apr. 3, 2012

(54) BIOMETRIC AUTHENTICATION OF MOBILE FINANCIAL TRANSACTIONS BY TRUSTED SERVICE MANAGERS

(75) Inventors: Upendra Mardikar, San Jose, CA (US); Eric Duprat, San Jose, CA (US)

(73) Assignee: eBay Inc., San Jose, CA (US)

( * ) Notice: Subject to any disclaimer, the term of this patent is extended or adjusted under 35 U.S.C. 154(b) by 412 days.

(21) Appl. No.: 12/414,323

(22) Filed: Mar. 30, 2009

(65) Prior Publication Data
US 2009/0307139 A1   Dec. 10, 2009

Related U.S. Application Data

(60) Provisional application No. 61/059,395, filed on Jun. 6, 2008, provisional application No. 61/059,907, filed on Jun. 9, 2008.

(51) Int. Cl.
*G06Q 20/00* (2012.01)
(52) U.S. Cl. .............. 705/64; 713/186; 705/76
(58) Field of Classification Search .............. 705/64, 705/76
See application file for complete search history.

(56) References Cited

U.S. PATENT DOCUMENTS

| | | | |
|---|---|---|---|
| 6,269,348 B1 | 7/2001 | Pare, Jr. et al. | |
| 6,581,042 B2 | 6/2003 | Pare, Jr. et al. | |
| 6,819,219 B1 * | 11/2004 | Bolle et al. | 340/5.52 |
| 7,016,494 B2 * | 3/2006 | Hopkins et al. | 380/44 |
| 7,251,731 B2 * | 7/2007 | Laniepce et al. | 713/176 |
| 7,454,194 B2 * | 11/2008 | Kuwajima | 455/411 |
| 7,512,567 B2 | 3/2009 | Bemmel et al. | |
| 7,543,738 B1 * | 6/2009 | Saunders et al. | 235/380 |
| 2003/0163710 A1 * | 8/2003 | Ortiz et al. | 713/186 |
| 2003/0167207 A1 * | 9/2003 | Berardi et al. | 705/16 |
| 2005/0033688 A1 * | 2/2005 | Peart et al. | 705/39 |
| 2005/0171898 A1 | 8/2005 | Bishop et al. | |

(Continued)

FOREIGN PATENT DOCUMENTS
EP   2034428 A1 *   3/2009

OTHER PUBLICATIONS

"FIPS PUB 140-2", National Institute of Standards and Technology (NIST), May 25, 2001, all pages, http://csrc.nist.gov/publications/fips/fips140-2/fips1402.pdf.*

(Continued)

*Primary Examiner* — Andrew J. Fischer
*Assistant Examiner* — Calvin Cheung
(74) *Attorney, Agent, or Firm* — Haynes and Boone, LLP

(57) ABSTRACT

A method for authenticating a financial transaction at a point of sale (POS) includes storing an application program in a first secure element of a mobile phone. The application is configured to generate instruction codes to effect the financial transaction upon verification of a user's identity. The user's credentials are stored in a second SE of the phone, which is operable to verify the user's identity from a biometric trait of the user input to the phone and to generate data authenticating the financial transaction in response to the verification of the user's identity. At the POS, the user invokes the application and then inputs a biometric trait to the phone. The second SE verifies the user's identity, and upon verification, generates data authenticating the transaction. The financial transaction data, including the instruction codes and the authenticating data, are then transmitted from the phone to the POS.

19 Claims, 4 Drawing Sheets

U.S. PATENT DOCUMENTS

| | | | |
|---|---|---|---|
| 2005/0187883 A1* | 8/2005 | Bishop et al. | 705/67 |
| 2005/0190912 A1* | 9/2005 | Hopkins et al. | 380/44 |
| 2005/0242177 A1* | 11/2005 | Roberge et al. | 235/383 |
| 2005/0273609 A1 | 12/2005 | Enronen | |
| 2006/0023486 A1* | 2/2006 | Furusawa et al. | 365/145 |
| 2006/0287004 A1* | 12/2006 | Fuqua | 455/558 |
| 2007/0022058 A1 | 1/2007 | Labrou et al. | |
| 2007/0052517 A1* | 3/2007 | Bishop et al. | 340/5.2 |
| 2007/0092114 A1* | 4/2007 | Ritter et al. | 382/115 |
| 2007/0136211 A1* | 6/2007 | Brown et al. | 705/75 |
| 2007/0175023 A1* | 8/2007 | Heitmann et al. | 29/832 |
| 2007/0197261 A1* | 8/2007 | Humbel | 455/558 |
| 2007/0293202 A1* | 12/2007 | Moshir et al. | 455/414.2 |
| 2007/0295803 A1* | 12/2007 | Levine et al. | 235/379 |
| 2008/0064346 A1* | 3/2008 | Charrat | 455/131 |
| 2008/0065885 A1 | 3/2008 | Nagai et al. | |
| 2008/0129450 A1* | 6/2008 | Riegebauer | 340/5.86 |
| 2008/0144650 A1* | 6/2008 | Boch et al. | 370/464 |
| 2008/0155268 A1* | 6/2008 | Jazayeri et al. | 713/186 |
| 2008/0201264 A1* | 8/2008 | Brown et al. | 705/67 |
| 2008/0207124 A1* | 8/2008 | Raisanen et al. | 455/41.2 |
| 2008/0230615 A1* | 9/2008 | Read et al. | 235/492 |
| 2009/0143104 A1* | 6/2009 | Loh et al. | 455/558 |

OTHER PUBLICATIONS

"Contactless Technology for Secure Physical Access: Technology and Standards Choices", Smart Card Alliance, Oct. 2002, all pages, http://www.smartcardalliance.org/resources/lib/Contactless_Technology_Report.pdf.*

"NFC = Simplicity", Nokia, 2007, all pages, http://www.hccomp.eu/files/NFC-4.pdf.*

"Understanding the Requirements of ISO/EIC 14443 for Type B Proximity Contactless Identification Cards", Amtel, Nov. 2005, all pages, http://www.atmel.com/dyn/resources/prod_documents/doc2056.pdf.*

Baddeley, D., "ISO/IEC 14443-3 Identification cards—Contactless integrated circuit(s) cards—Proximity cards—Part 3: Initialization and anticollision", ISO/EIC, Jun. 11, 1999, all pages, http://www.waazaa.org/download/fcd-14443-3.pdf.*

"Reader Series 4000: S4100 Multi-Function Reader Module RF-MGR-MNMN ISO 14443 Library Reference Guide", Texas Instrument, Oct. 2003, all pages, http://www.ti.com/rfid/docs/manuals/refmanuals/RF-MGR-MNMN-14443-refGuide.pdf.*

U.S. Appl. No. 60/974,424, filed Sep. 21, 2007.*

* cited by examiner

BIOMETRIC AUTHENTICATION OF MOBILE FINANCIAL TRANSACTIONS BY TRUSTED SERVICE MANAGERS

RELATED APPLICATIONS

This application claims benefit of U.S. Provisional Application Nos. 61/059,395, filed Jun. 6, 2008, and 61/059,907, filed Jun. 9, 2008, the respective disclosures of which are incorporated herein by reference.

BACKGROUND

1. Technical Field

This disclosure relates to electronic financial transactions in general, and more particularly, to methods and systems for biometric authentication of financial transactions by a trusted service manager (TSM).

2. Related Art

"Contactless technology" refers to short distance communications between two devices that are not physically connected. A wide variety of contactless technology exists today. Near Field Communication (NFC) is a specific type of contactless technology that is of high importance to Mobile Network Operators (MNOs) and to Service Providers (SPs), such as banks, credit card issuers and other payment service providers. NFC is a short-range, high frequency, wireless, RF communication technology that enables the exchange of data between devices typically over about a 10 centimeter (or about 4 inches) distance, thus providing a fast, simple and secure way for a user to effect a wide range of contactless services with a mobile device, such as a mobile telephone or personal digital assistant (PDA).

One example of an NFC technology application is financial transactions. NFC mobile devices and other types of contactless devices, such as radio frequency-enabled credit/debit cards, key fobs, and the like are experiencing rapid growth worldwide in various industries, including transportation, retail, parking and other industries, that will now accept NFC mobile payments and other types of contactless payments.

As an example, wireless mobile devices that include an NFC device and a smart card, which may use radio frequency identification (RFID) technology for identification purposes, can enable a person to effect a simple financial transaction, such as the purchase of a retail item, in a convenient, secure manner. Typically, a consumer waves the wireless mobile NFC device near a "reader" to effect a monetary transfer, and the purchase price of the item is deducted from a total amount that is available and stored on a "smart card" of the wireless mobile device. Optionally, the amount of the item may be forwarded to a server that can identify the purchaser through a unique identification code of the purchaser and then subsequently debit a credit or deposit account of the purchaser appropriately for the purchase of the retail item. Such NFC-based point of sale (POS) transactions provide several advantages, such as eliminating the need to carry cash and enabling faster, more convenient and secure financial transactions.

Because customers are interested in being able to use their mobile devices for contactless services, a new mobile NFC "ecosystem," illustrated in FIG. 1, has been defined by the Global System for Mobile communication Association (GSMA), which is a global trade association representing over 700 GSM mobile phone operators throughout the world. (See, e.g., "Mobile NFC Services," GSMA, Version 1.0, February 2007). As illustrated in FIG. 1, such ecosystems involve a variety of different players or entities and new roles for such players, including:

Customer—the customer is a customer of a merchant and subscribes to a Mobile Network Operator (MNO) and a service provider.

MNO—the MNO provides a full range of mobile services to the Customer, and may also provide Universal Integrated Circuit Cards (UICCs) and NFC terminals, plus Over the Air (OTA) transport mechanisms.

Service Provider (SP)—the SP provides contactless services to the Customer. Examples of SPs include banks, credit card issuers as well as public transport companies, loyalty programs owners, and the like.

Retailer/Merchant—the retailer/merchant may operate an NFC capable point of sale (POS) terminal.

Trusted Service Manager (TSM)—the TSM securely distributes and manages NFC applications and may have, for example, a direct or an indirect relation to the SPs, e.g., via clearing houses, such as the Automated Clearing House (ACH), the Electronic Payment Network (EPN) or the Visa/MasterCard network.

Handset, NFC Chipset and UICC Manufacturers—the Manufacturers produce mobile NFC/communication devices and the associated UICC hardware.

Reader Manufacturer—the reader manufacturer makes NFC reader devices.

Application Developers—the application developers design and develop mobile NFC applications, including financial transaction applications.

Standardization bodies and industry associations—develop global standards for NFC that enable interoperability, backward compatibility and future development of NFC applications and services.

As will be appreciated, successful implementation of NFC technologies requires cooperation between the many disparate players of the GSMA ecosystem. Each player may have its own expectations, for example, the Customer expects convenient, friendly and secure services within a trusted environment; the SPs want their applications to be housed and used in as many mobile devices as possible; and the MNOs want to provide new mobile contactless services that are secure, of high quality and consistent with the existing services experienced by the Customer. But although each player may have its own culture and expectations, they all have the same basic requirement, viz., the need for security and confidentiality.

The Trusted Service Manager (TSM), in particular, brings trust and convenience to the complex, multi-player NFC ecosystem. The TSM role includes providing a single point of contact for the SPs, e.g., banks, to access their respective customer bases through the MNOs, and to secure download and lifecycle management for mobile NFC applications on behalf of the SPs. It should be understood that the TSM does not disrupt the SP's business model, as the TSM does not participate directly in the transaction stage of the service, but rather, only indirectly.

In addition to NFC based POS payments, there are a number of other payment models currently prevalent in the mobile industry including:

(i) Short Message Service (SMS)—SMS is a communications protocol that allows the interchange of short text messages between mobile devices; and, (ii) Mobile Internet-based payments—Customers routinely search for and purchase products and services through electronic communications with online merchants over electronic networks, such as the Internet.

Regarding the latter, individual customers may frequently engage in transactions with a variety of merchants through, for example, various merchant websites. Although a credit card may be used for making payments over the Internet, a disadvantage of online credit card usage is that online merchants may be exposed to high fraud costs and "chargeback fees" because there is no credit card authentication signature with an online sale.

In the case of in-person POS payments made with payment cards, such as with Master Cards or Visa cards in the U.S., or a "Chip and PIN" card in the U.K., current authentication is by means of the purchaser's provision of a signature or a personal identification number (PIN).

Accordingly, systems and methods are needed for authenticating NFC based POS transactions securely and reliably without the need for signatures or PINs, and more particularly, for authentication of POS transactions using a biometric trait, such as a fingerprint, that can be input via a data communication device of the user, e.g., the user's mobile phone.

SUMMARY

In accordance with the present disclosure, methods and apparatus are provided that enable the authentication of financial transactions to be indirectly effected as a value added service by a service provider acting as a TSM for credit/payment provider companies in which biometric authentication data of the transactions is provided directly at the POS via an NFC enabled mobile telephone without the need for the credit/payment providers having to provide it.

In one embodiment, a method for authenticating a financial transaction at a point of sale (POS) includes storing an application program in a first secure element (SE) of a mobile phone equipped with a user biometric trait input device. The application program is configured to generate instruction codes to effect the financial transaction upon verification of a user's identity. The credentials of the user are stored in a second SE of the phone, which is operable to verify the user's identity from a biometric trait of the user input to the phone and to generate data authenticating the financial transaction in response to the verification of the user's identity.

At the POS, the user activates the phone, invokes the application program thereon and inputs a biometric trait to the phone, e.g., swipes a thumb on a fingerprint reader of the phone. The second SE verifies the user's identity from the biometric trait input to the phone, and upon such verification, generates data authenticating the transaction. The data of the financial transaction, including the instruction codes therefor and the data authenticating the financial transaction, are then transmitted from the phone to a data communication device at the POS, which in one embodiment, may be effected via a NFC link between the phone and the POS device.

One or more of the storing of the application program in the first SE, the storing of the user's credentials in the second SE, and the generating of the data authenticating the transaction in response to the verification of the user's identity may comprise a value added service performed by a trusted service manager (TSM) on behalf of a third party credit or a payment service provider.

A better understanding of the above and many other features and advantages of the novel TSM transaction authentication systems and methods of the present disclosure may be obtained from a consideration of the detailed description of some example embodiments thereof below, particularly if such consideration is made in conjunction with the several views of the appended drawings, wherein like elements are referred to by like reference numerals throughout.

DETAILED DESCRIPTION

In accordance with the embodiments described herein, methods and systems are provided that enable financial service providers, such as PayPal, acting in the role of a Trusted Service Manager (TSM), to authenticate NFC based POS transactions using biometric identifier traits, such as a fingerprint, that can be input via a data communication device of the user.

Figure 2:
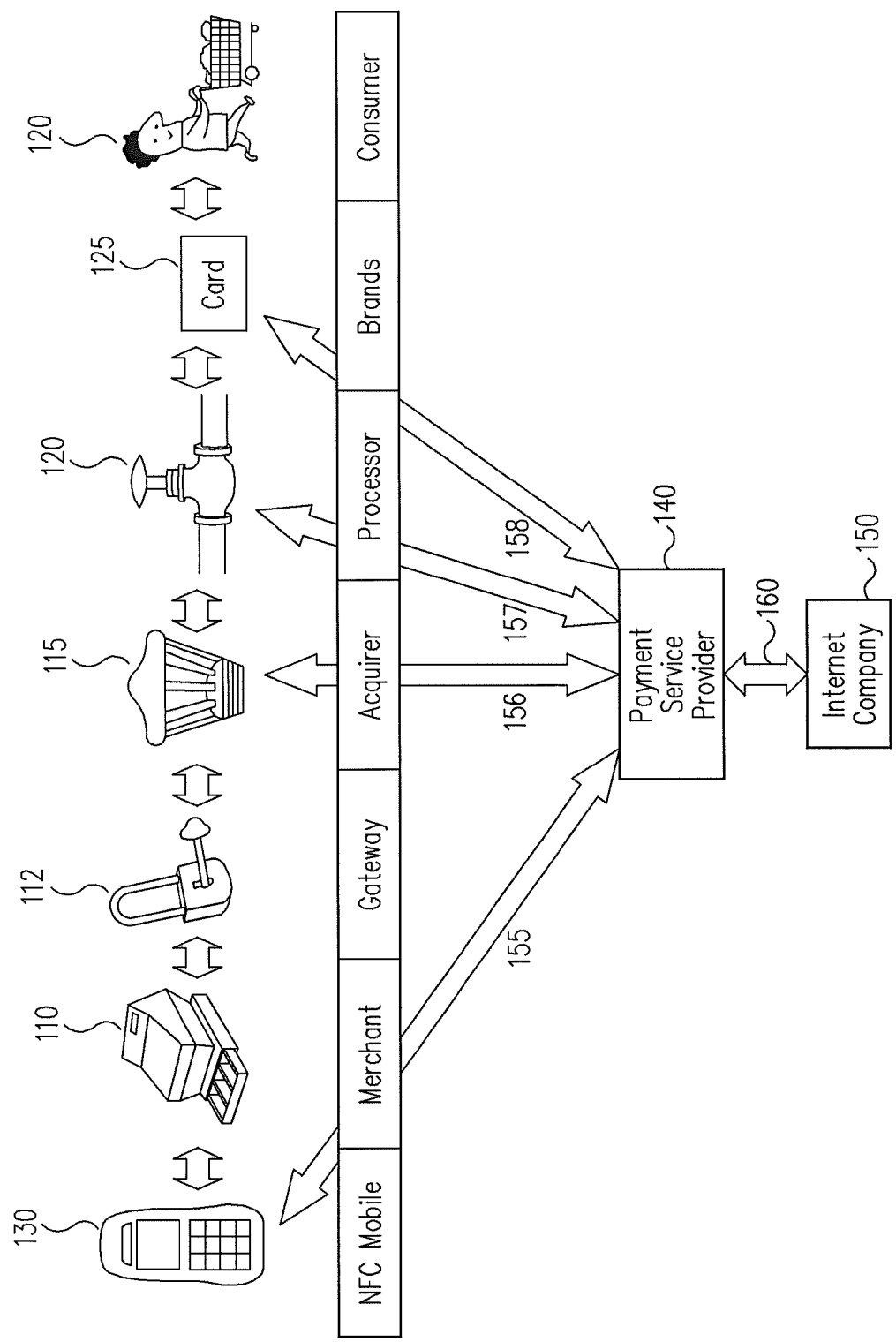
FIG. 2 is a schematic representation of the architecture of an example embodiment of an electronic payment system in accordance with the present disclosure.

FIG. 2 is a schematic representation of an example embodiment of an electronic payment system in accordance with the present disclosure. A financial transaction using, for example, an NFC based Point of Sale (POS) payment system, may be made using a client data communication device 130, such as an NFC enabled mobile phone, to a retailer or merchant via a retailer or merchant server 110. It should be appreciated that although an NFC application is illustrated in this embodiment, the system is not limited to NFC applications, but may also apply to other types of applications, for example, video game consoles, DVRs, and other appliances.

The client device 130 may be implemented using any appropriate combination of hardware and/or software configured for wired and/or wireless communication over a network. For example, in one embodiment, the client device 130 may be implemented as a personal computer of a user 120 (also referred to herein as a "customer" or "consumer") in communication with the Internet or another network, such as a public switched telephone network (PSTN) and/or a private data network. In other embodiments, the client device 130 may be implemented as a wireless telephone, personal digital assistant (PDA), key fob, smart card, notebook computer or other type of data communication device. Furthermore, the client device 130 may be enabled for NFC, Bluetooth, online, infrared communications and/or other types of wireless data communication channels.

The client device 130 may include various applications as may be desired in particular embodiments to provide desired features to the client device 130. Such applications may include, for example, security applications for implementing client-side security features, programmatic client applications for interfacing with appropriate application programming interfaces (APIs) over a network, or other types of applications.

The client device 130 may further include one or more user identifiers that may be implemented, for example, as operating system registry entries, cookies associated with a browser application, identifiers associated with hardware of client device 130, or other appropriate identifiers. In one embodiment, a user identifier may be used by a payment service provider 140 to associate the client device 130 or the user 120 with a particular account maintained by a payment service provider 140, such as PayPal, as described in more detail below.

Of importance, the client device 130 may further include a device useful for biometric authentication, such as a integral fingerprint scanner. Increasingly today, mobile phones are being equipped with such devices. When the phone is "flipped," or activated, the biometric trait reader reads the fingerprint of the user, confirms the identity of the user from the biometric trait, and upon confirmation of the user's identity, unlocks a credential/payment instrument located in one or more Secure Element(s) incorporated in the phone. As discussed in more detail below, when the phone is then "tapped" on an NFC enabled POS, an authenticated payment is effected via the user's biometric data input to the phone.

The merchant server 110 may be maintained, for example, by a retailer or by an online merchant offering various products and/or services in exchange for payment to be received over a network, such as the Internet. The merchant server 110 may be configured to accept payment information from the user 120 via, for example, the client device 130 and/or from a payment service provider 140 over a network. It should be appreciated that although a user-merchant transaction is illustrated in this particular embodiment, the system may also be applicable to user-user, merchant-merchant and/or merchant-user transactions.

The merchant server 110 may use a secure gateway 112 to connect to an acquirer 115. Alternatively, the merchant server 110 may connect directly with the acquirer 115 or a processor 120. Once verified, the acquirer 115, which may also have a relation or subscription with the payment service provider 140, processes the transaction through the processor 120 or the payment service provider 140. "Brands" 125, for example, bank payment card issuers, which also have a relation or subscription with the payment service provider 140, are then also involved in the payment transaction so as to enable the user 120 to complete the purchase.

The payment service provider 140 may have data connections 155, 156, 157 and 158 with a subscriber client device 130, a subscriber acquirer 115, a subscriber processor 120 and/or a subscriber brand 125, respectively, to communicate and exchange data. Such data connections 155, 156, 157 and 158 may take place, for example, via the Short Message Service (SMS) or a Wireless Application Protocol (WAP) over a network. In addition, according to one or more embodiments, the payment service provider 140 may have a data connection 160 with subscriber Internet companies, Internet mortgage companies, Internet brokers or other Internet companies 150.

The payment service provider 140, which may be an online payment provider, may provide payment on behalf of the user 120 to the operator of the merchant server 110 via the network 210. In this regard, the payment service provider 140 includes one or more payment applications that may be configured to interact with the client device 130 and/or the merchant server 110 over the network 210 to facilitate the purchase of items by the user 120 from the merchant server 110. In one embodiment, the payment service provider 140 may be provided by PayPal.

Each of the client data communication device 130, the merchant server 110, and the payment service provider 140 may include one or more processors, memories, and other appropriate components for executing instructions, such as program code and/or data stored on one or more computer readable mediums to implement the various applications, data, and methods described herein. For example, such instructions may be stored in one or more computer readable media, such as memories or data storage devices internal and/or external to various components of the system, and/or accessible over a network, which may be implemented as a single network or a combination of multiple networks, for example, the Internet or one or more intranets, landline networks, wireless networks, and/or other appropriate types of networks.

As discussed above, the payment service provider 140 can also serve in the role of a Trusted Service Manager (TSM). In one example embodiment of this, the payment service provider 140, acting in the role TSM, may work cooperatively with a Mobile Network Operator (MNO) to incorporate an authentication certificate issued by the payment service provider, acting as a Certificate Authority (CA), in a Secure Element (SE) or Subscriber Identity Module (SIM) card 215 of a client device 130. This SE or SIM card may follow security guidelines, such as The Federal Information Processing Standard (FIPS) Publication 140-2 (FIPS 140-2 Level 2/3), a U.S. government computer security standard issued by the National Institute of Standards and Technology (NIST) and used to accredit cryptographic modules. The client device 130 may already have payment service provider issued certificates and user biometric trait information, such as the user's digitized fingerprint, stored within it for personalization purposes. When customers or users activate their payment service provider application 225, such as a PayPal payment application, which may also be incorporated in the client device 130 in an "application SE," the users or customers are asked to select a PIN, which may be optional or mandatory. The PIN protects the private key of the authenticating certificate.

When a transaction, for example a financial transaction using NFC service application 217 of an NFC enabled client device 130, is made via a payment service provider 140 such as PayPal, the service provider 140 receives signature information in the form of, for example, a X.509 certificate. X.509 is an ITU-T standard for a public key infrastructure (PKI) for single sign-on and Privilege Management Infrastructure (PMI). This X.509 signature information is typically maintained for each registered user of the service provider 140. The signature information may be a digital signature and may include a time stamp, dollar amount, transaction type, item, and even location, which may be determined from a GPS enabled client device 130. Signature information may also be preloaded in client device 130 in, for example, other applications, such as EMV (Europay, MasterCard, Visa), a standard for interoperation of IC cards ("Chip cards") and IC capable POS terminals and ATM's, for authenticating credit and debit card payments, or Elliptic Curve Cryptography (ECC), another form of public-key cryptography, in addition to X.509. In addition to NFC, the client device 130 may also be enabled for, e.g., Bluetooth, infrared or other types of communications and/or transactions.

Figure 3:
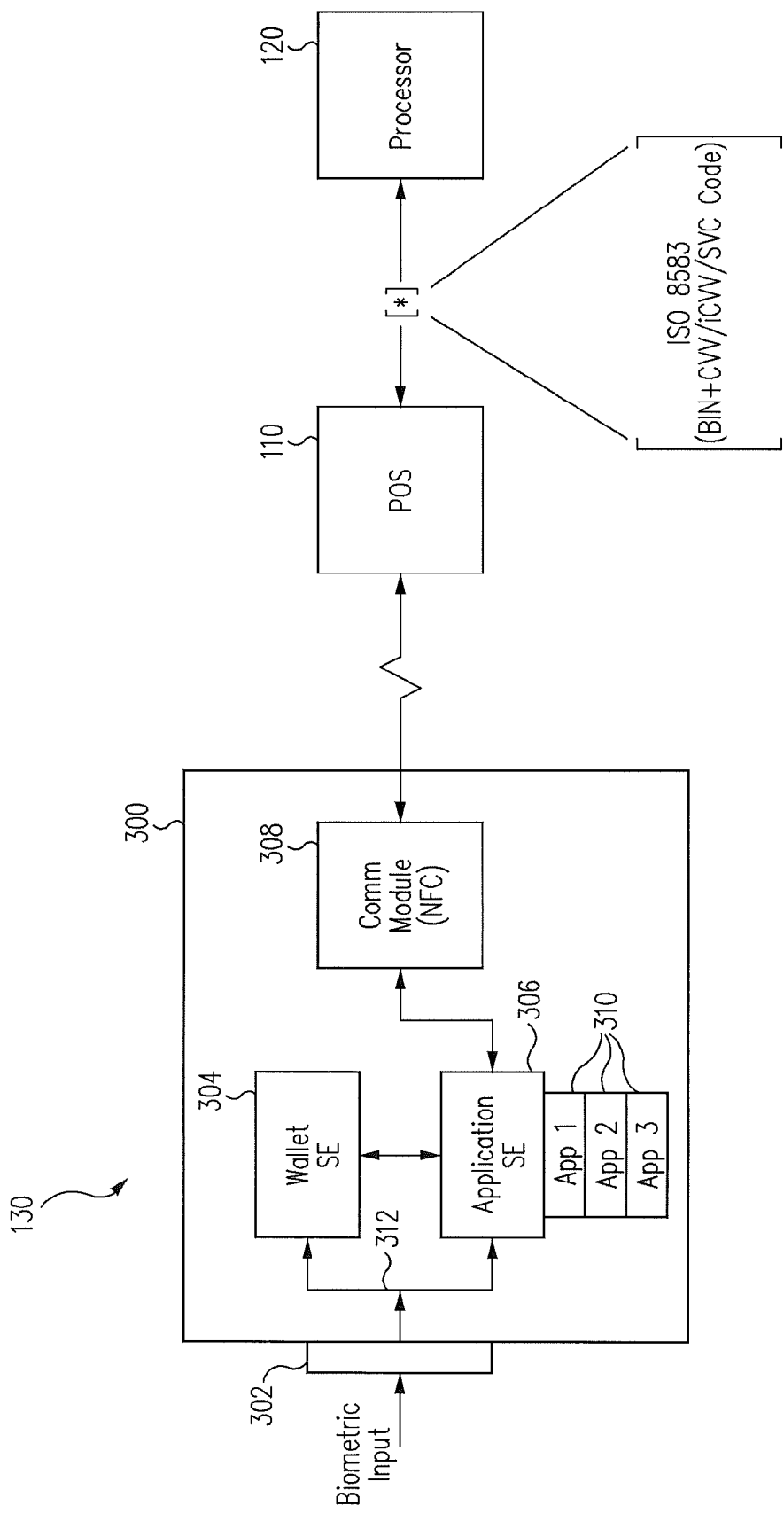
FIG. 3 is a functional block and data flow diagram of an example embodiment of a mobile phone equipped with a POS transaction authenticating Secure Element (SE) architecture in accordance with the present disclosure engaged in transactional communication with a merchant's Point Of Sale (POS) device in accordance with the present disclosure; and, FIG. 4 is flow diagram of an exemplary embodiment of a method for making a biometrically authenticated NFC based payment at a POS in accordance with the present disclosure.

FIG. 3 is a functional block and data flow diagram of an example embodiment of a client device 120 that comprises an NFC enabled mobile phone 300 engaged in transactional communication with a NFC enabled Point Of Sale (POS) data communication device 120 of, e.g., a merchant, in accordance with the present disclosure. In the particular embodiment of FIG. 3, the phone 300 is equipped with a biometric trait data input device 302, such as a fingerprint scanner, a POS transaction authenticating "Payment/Wallet" Secure Element (SE) 304, an "Application" SE 306, and an NFC communication module 308, as described above.

With reference to FIG. 3, it may be noted that the two SEs 304 and 306 comprise two separate elements, viz., a Payment/Wallet SE 304, which can be, e.g., a SIM card, that stores only payment instruments, certificates, keys, user accounts, credentials and biometric trait authentication data, and the like, and an Application SE 306, which may also be a SIM card, that stores only application programs 310 adapted to, e.g., generate instruction codes to effect final transactions, such as the purchase of goods or services or the transfer of money to or from the user. Thus, no user payment instruments, account data, certificates, keys or credentials reside in the Application SE 306. In the particular embodiment illustrated, the Payment/Wallet SE 304 supports biometric trait authentication of the user, and the two SEs 304 and 306 are therefore split into two separate devices because, once the Payment/wallet SE 304 is certified by the TSM, such as through MasterCard or VISA, with the user's biometric trait data and other credential data, the phone 300 is then TSM-certified for use. Then, if it later becomes desirable to modify application programs of or add additional programs to the Application SE 306, a new or recertification procedure does not have to be performed each time they are modified or added, because applications do not need to be certified, whereas, Payment/Wallet SEs 306, containing as they do the user's TSM-authenticated credentials, must be certified by the TSM before use with the affected payment service providers.

The initial set-up or programming of the Payment/Wallet SE 306 needs to be done only once, and may be performed at the premises of the TSM, or alternatively, over the air (OTA). Likewise, new or updated applications can be uploaded to the Applications SE 304 of the phone 300 either locally or OTA.

In one advantageous embodiment, the Payment/Wallet SE 306 may also be configured to store a list of transactions or account or receipt management information that can be viewed by the user at will on the phone 300 and/or downloaded to a PC for integration with the user's money management tools, such as Quicken, Microsoft Money, dedicated toolbars, or other PC software, such as expense management and expense submission tools and flexible spending account submissions.

As discussed above, current authentication of transactions via payment cards is typically by way of a user's signature or PIN. In Europe, authentication may also be via "Chip and PIN". However, as illustrated in FIG. 3, in accordance with the present disclosure, the authentication of financial transactions, such as at a POS 110, can be indirectly effected as a value added service by a service provider acting as a TSM for credit/payment provider companies, such as MasterCard and Visa, in which POS biometric authentication occurs directly via the mobile phone 300. This biometric authentication can serve as signature/PIN/Chip and PIN/ARQC-ARPC authentication for all transactions. The authenticated transaction is then submitted to the POS device 110 via the NFC link between the NFC communication module 308 of the phone 300 and the POS device 110. The POS device 110 receives the transaction as a pre-verified or pre-authenticated request, and in turn, transmits it to the host processor 120 for further processing in the form of an ISO 8583 message containing a Card Verification Value (CVV) code or a Contactless Card and Chip Verification (iCVV) code field, and other information, such as a Stored-Value Card (SVC) code and/or a bank identification number (BIN) code. Thus, a user's initial input of a biometric trait via the input device 302 may be used both to unlock the phone 300 and to authorize financial transactions without the need for the credit/payment providers having to do so.

Figure 4:
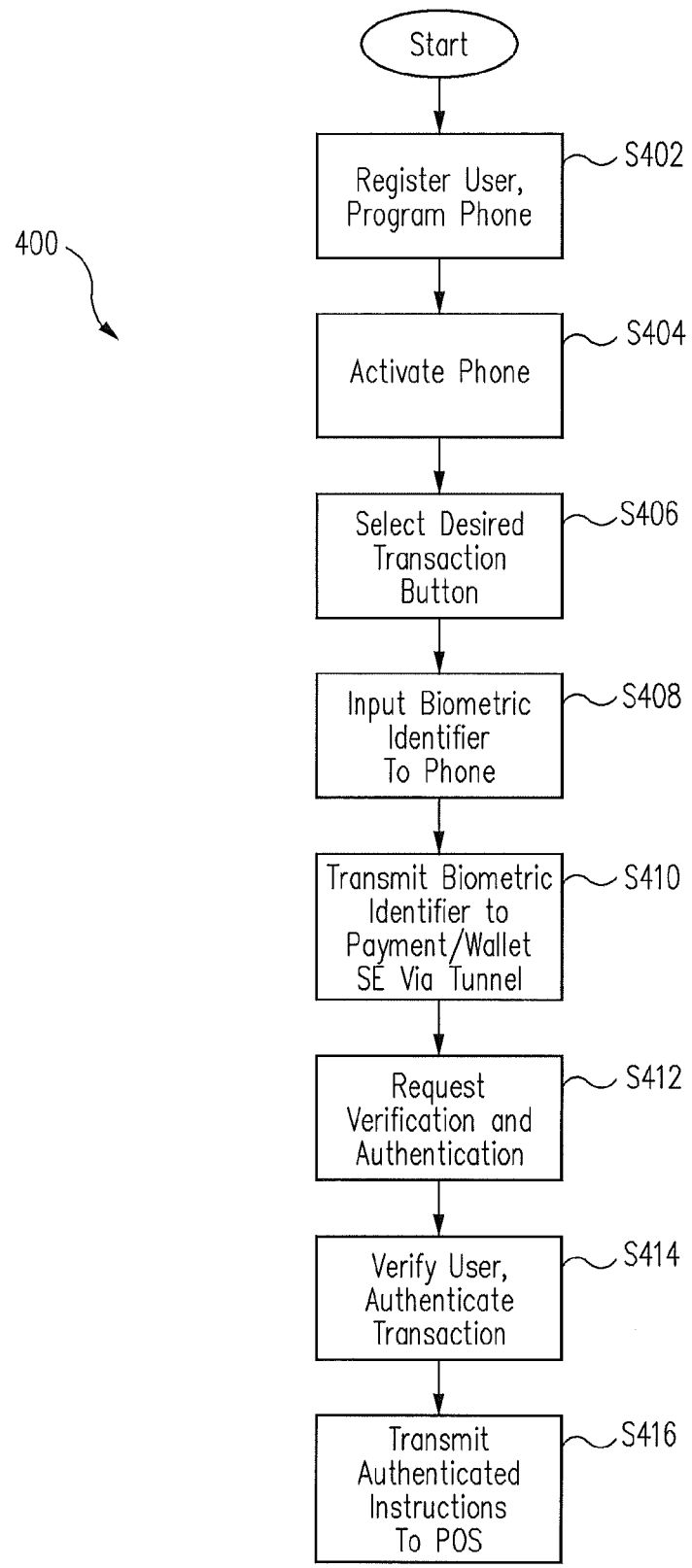

FIG. 4 is flow diagram of an exemplary embodiment of a method 400 for making a biometrically authenticated NFC based payment at a POS 110 using the NFC and biometric trait data enabled phone 300 of FIG. 3 in accordance with the present disclosure. With reference to FIG. 4, the method 400 begins at S402 with the one-time setup or user registration procedure with the TSM as described above.

After the initial registration of the user with the TSM is complete, during which step S402, the Payment/Wallet SE 304 of the phone 330 is programmed with the user's credentials and the Application SE 306 of the phone 300 is programmed with one or more suitable financial transaction application programs 310, the phone 300 is then ready for use in making authenticated financial transactions. In an example purchase transaction at a POS 110, such as illustrated in FIG. 3, the user, in the role of a purchaser, may, at S404, first activate the phone 300, e.g., by opening it. At S406, the user may then select a "Make Payment" button on the phone 300. Selecting the Make Payment button invokes a suitable payment application program 310 in the Application SE 306 of the phone 300 that is adapted to, among other things, read a biometric trait of the user, e.g., the user's thumb-print and request verification of it by the Payment/Wallet SE 304.

At S408, the user-purchaser then swipes his or her thumb on the biometric trait input device 302 of the phone 302, and at S410, this biometric trait input is fed directly to the Payment/Wallet SE 304 of the phone 300 via a "tunnel" circuitry 312. Optionally, the thumb swipe may also be operable to unlock the phone for use. Preferably, a tunnel circuit 312 is used for security purposes because the architecture of the user's fingerprint is such that it can otherwise be captured by an application on a mobile phone. To prevent this, a tunnel encryption circuitry 312 that is FIPS 140-2 level 3 compliant is incorporated in the phone 300 so that the fingerprint data goes directly to the Payment/Wallet SE 304 of the phone 300 for authentication and unlocking.

At S412, the payment application 310 that was invoked by pressing the Make Payment button sends a message to the Payment/Wallet SE 304 requesting user verification and payment authentication. At S414, when the Payment/Wallet SE 304 verifies the user's thumbprint, and based thereon, authenticates the payment, the Payment/Wallet SE 304 sends the authenticated payment (or other) instructions back to the payment application 310, which then sends it to the NFC communication module 308 of the phone 300.

At S416, when the user then "taps" the phone 300 on the merchant's POS device 110, the pre-authenticated payment instructions are transmitted via an NFC link to the POS device 110, and thence, to the merchant's processor device 110. As above, the payment instructions include not only all of the payment information needed to effect the transaction, such as the user's account information or credit balance, but also all of the information necessary to authenticate the transaction, including CVV, iCVV, SVC and/or BIN codes, without the need for the credit/payment service providers having to provide it.

As those of skill in this art will appreciate, although the foregoing method is described in the context of a transaction involving a purchase of goods or services at a POS, it is evident that it can be made applicable to other types of financial transactions, such as the deposit or withdrawal of cash at an automated teller machine (ATM).

Figure 1:
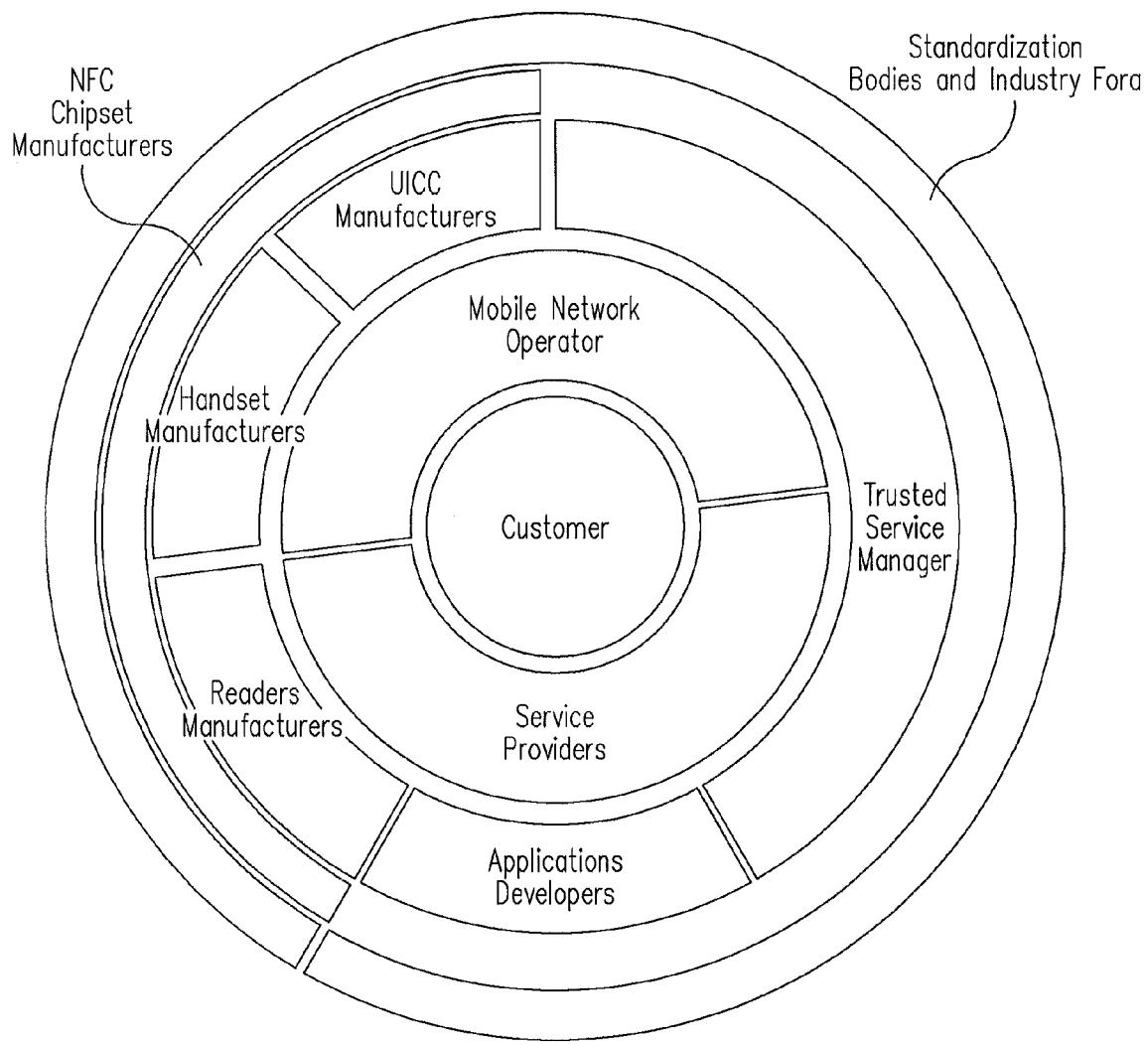
FIG. 1 is a schematic representation of a mobile NFC "ecosystem" defined by the Global System for Mobile communication Association (GSMA)

Although various components and steps have been described herein as being associated with the client device 130, merchant server 110, and payment service provider 140 of FIGS. 1-3, it is contemplated that the various aspects of such servers illustrated in FIGS. 1-3 may be distributed among a plurality of servers, devices, and/or other entities. For example, in one embodiment, transaction record processing application 290 and transaction records 295 may be implemented by an entity separate from payment service provider 140. Accordingly, in such an embodiment, communications described herein performed in relation to transaction record processing application 290 and transaction records 295 may be provided to a separate entity and need not be routed through payment service provider 140 in all instances.

Where applicable, various embodiments provided by the present disclosure may be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable media. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide the features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Although the apparatus and methods of the present invention have been described and illustrated herein with reference to certain specific example embodiments thereof, it should be understood that a wide variety of modifications and variations may be made to these without departing from the spirit and scope of the invention, as defined by the claims appended hereafter and their functional equivalents.

What is claimed is:

1. A method for authenticating a financial transaction with a vendor at a point of sale (POS), the method comprising:
   storing an application program in a first secure element (SE) of a mobile phone equipped with a user biometric trait input device, the application program programmed to
   cause a biometric trait of the user to be read via the biometric trait input device,
   request verification of the biometric trait and authentication of the financial transaction from a second SE of the phone separate from the first SE, and
   generate transaction instruction codes to effect and authenticate the financial transaction upon verification of the user's identity by the second SE; and,
   storing credentials of the user in the second SE of the phone, the second SE being operable in response to the request from the application program to
   verify the user's identity from the biometric trait of the user input to the phone,
   generate data authenticating the financial transaction in response to the verification of the user's identity, and
   transmit the authenticating data back to the first SE,
   wherein the authenticating of the financial transaction is performed by a third party service provider acting as a trusted service manager (TSM) in cooperation with and on behalf of one or more third party credit or payment service providers, and
   wherein the instruction codes include all of the information necessary to both effect and authenticate the transaction without the need for the third party credit or payment service providers having to provide it.

2. The method of claim 1, further comprising:
   invoking the application program on the phone from the first SE when the user turns on the phone at the POS;
   verifying the user's identity with the second SE in response to the inputting of the user's biometric trait to the phone via the user biometric trait input device;
   generating the data authenticating the transaction in response to the verification of the user's identity with the second SE;
   transmitting the authenticating data back to the first SE,
   transmitting the data of the financial transaction, including the transaction instruction codes and the data authenticating the financial transaction, from the phone to a POS data communication device using the application program, and
   transmitting the data of the authenticated financial transaction from the POS data communication device to a transaction processing device of the vendor.

3. The method of claim 2, wherein the transmitting of the transaction data from the phone to the POS data communication device is effected through a near field communication (NFC) link between the phone and the POS data communication device.

4. The method of claim 3, wherein the transmitting of the transaction data from the phone to the POS data communication device comprises bringing the phone to within a distance of from about 0 to about 10 centimeters from the POS data communication device.

5. The method of claim 2, wherein the inputting of the biometric trait of the user to the phone comprises reading a fingerprint of the user.

6. The method of claim 2, wherein at least one of the first and second SEs comprises a Subscriber Identity Module (SIM) card.

7. The method of claim 2, wherein the inputting of the biometric trait of the user to the phone is operable to unlock the phone for use.

8. The method of claim 2, wherein the inputting of the biometric trait of the user to the phone comprises transmitting data corresponding to the biometric trait directly from the biometric trait input device to the second SE via a data encryption tunnel circuit.

9. The method of claim 2, wherein the data authenticating the transaction comprises at least one of a Card Verification Value (CVV) code, a Contactless Card and Chip Verification Value (iCVV) code, a Stored-Value Card (SVC) code and a bank identification number (BIN) code.

10. The method of claim 2, wherein one or both of the storing of the application program in the first SE and the storing of the user's credentials in the second SE is performed by the TSM.

11. The method of claim 2, wherein the POS data communication device comprises an automated teller machine (ATM), and further comprising depositing cash in or vending cash from the ATM to the user.

12. An apparatus for making an authenticated financial transaction
   with a vendor at a point of sale (POS), the apparatus comprising a mobile phone that includes:
   a user biometric trait input device;
   a near field communication (NFC) module; and
   an Application security element (SE) storing an application program programmed to cause a biometric trait of the user to be read via the biometric trait input device, request verification of the biometric trait and authentication of the financial transaction from a Payment/Wallet SE of the phone separate from the Application SE, and generate transaction instruction codes to effect and authenticate the financial transaction upon verification of the user's identity by the Payment/Wallet SE, wherein the Payment/Wallet SE stores credentials of the user and is operable in response to the request from the application program to verify the user's identity from a biometric trait of the user input to the phone, generate data authenticating the financial transaction in response to the verification of the user's identity, and transmit the authenticating data back to the Application SE, wherein authentication of the financial transaction is performed by a third party trusted service manager (TSM) acting in cooperation with and on behalf of third party credit or payment service providers, and wherein the instruction codes include all of the information necessary to both effect and authenticate the transaction without the need for the third party credit or payment service providers having to provide it.

13. The apparatus of claim 12, wherein the user biometric trait input device comprises a fingerprint reader.

14. The apparatus of claim 12, wherein the biometric trait input device is coupled to the Payment/Wallet via a data encryption tunnel circuit.

15. The apparatus of claim 14, wherein the data encryption tunnel circuit complies with the Federal Information Processing Standard (FIPS) Publication 140-2 (FIPS 140-2) Level 3 standard.

16. The apparatus of claim 12, wherein the credentials of the user comprise at least one of the group consisting of a user payment instrument, a user certificate, a user account key, a user account and user biometric trait authentication data.

17. A method for making a purchase from a vendor at a point of sale (POS), the method comprising:

registering a user with a third party trusted service manager (TSM) engaged in the business of authenticating financial transactions in cooperation with and on behalf of third party credit or payment service providers;

storing an application program in an Application secure element (SE) of a mobile phone of the user, the application program programmed to cause a biometric trait of the user to be read via the biometric trait input device, request verification of the biometric trait and authentication of the financial transaction from a Payment/Wallet SE of the phone separate from the Application SE, and generate transaction instruction codes to effect and authenticate the purchase upon a verification of the user's identity by the Payment/Wallet SE; and storing credentials of the user in the Payment/Wallet SE of the user's phone, the Payment/Wallet SE being operable in response to receiving the request from the application program to verify the user's identity from a biometric trait of the user input to the phone, generate data authenticating the purchase in response to the verification of the user's identity, and transmit the authenticating data back to the Application SE, wherein the application program is further operable in response to receiving the data authenticating the transaction from the Payment/Wallet SE and the phone being placed within a distance of from about 0 to about 10 centimeters from a data communication device at the POS to transmit the data of the financial transaction, including the transaction instruction codes and the data authenticating the financial transaction, from the phone to the data communication device at the POS, wherein the financial transaction is authenticated by the third party TSM, and wherein the instruction codes include all of the information necessary to both effect and authenticate the transaction without the need for the third party credit or payment service providers having to provide it.

18. The method of claim 17, wherein the credentials of the user comprise at least one of the group consisting of a user payment instrument, a user certificate, a user account key, a user account and user biometric trait authentication data; and, the data authenticating the transaction comprises at least one of a Card Verification Value (CVV) code, a Contactless Card and Chip Verification Value (iCVV) code, a Stored-Value Card (SVC) code and a bank identification number (BIN) code.

19. The method of claim 17, wherein the data of the financial transaction is transmitted from the phone to the data communication device at the POS in an encrypted form.

* * * * *